United States Patent [19]

Vyvial et al.

[11] Patent Number: 4,493,807
[45] Date of Patent: Jan. 15, 1985

[54] PROCESS FOR PRODUCING SHEET-LIKE STRUCTURES FROM VINYL ALCOHOL POLYMERS

[75] Inventors: Rudolf Vyvial, Ludwigshafen; Christof Taubitz, Wachenheim; Lothar Schlemmer, Maxdorf; Gerhard Bleckmann, Lampertheim; Manfred Zuerger, Sinsheim; Heinrich Krieger, Telgte; Heino Thiele, Ludwigshafen, all of Fed. Rep. of Germany

[73] Assignee: BASF Aktiengesellschaft, Fed. Rep. of Germany

[21] Appl. No.: 443,615

[22] Filed: Nov. 22, 1982

[30] Foreign Application Priority Data

Nov. 28, 1981 [DE] Fed. Rep. of Germany ....... 3147326

[51] Int. Cl.³ .............................................. B29F 3/03
[52] U.S. Cl. .................................... 264/101; 264/102; 264/185
[58] Field of Search ........................ 264/101, 102, 185

[56] References Cited

U.S. PATENT DOCUMENTS

| | | | |
|---|---|---|---|
| 3,345,466 | 10/1967 | Kurashige | 264/185 |
| 3,873,508 | 3/1975 | Turner | 264/206 |
| 4,065,532 | 12/1977 | Wild et al. | 264/102 |
| 4,215,169 | 7/1980 | Wysong | 428/220 |
| 4,244,914 | 1/1981 | Ranalli et al. | 264/185 |

FOREIGN PATENT DOCUMENTS

| | | |
|---|---|---|
| 2114767 | 10/1971 | Fed. Rep. of Germany . |
| 2812684 | 9/1978 | Fed. Rep. of Germany . |
| 52-14666 | 11/1977 | Japan ................................. 264/102 |

*Primary Examiner*—Donald Czaja
*Assistant Examiner*—Mary A. Becker
*Attorney, Agent, or Firm*—Keil & Weinkauf

[57] ABSTRACT

A sheet-like structure is produced from a vinyl alcohol polymer by a method wherein, in a self-cleaning multi-screw extruder, the polymer is mixed with a small amount of water, the mixture is melted, homogenized, devolatilized and finally extruded as a melt, and the extrudate is shaped in a conventional manner into the sheet-like structure.

17 Claims, No Drawings

PROCESS FOR PRODUCING SHEET-LIKE STRUCTURES FROM VINYL ALCOHOL POLYMERS

The present invention relates to a process for the production of sheet-like structures from vinyl alcohol polymers by processing a vinyl alcohol polymer/water mixture in an extruder and shaping the product into the sheet-like structure.

Polyvinyl alcohol films, sheeting and panels have a wide range of uses in industry, in particular because they are soluble in water. For example, they are used for the production of packages, as covering or protective sheeting and for the production of photopolymer printing plates. However, it is more difficult to produce films or sheeting from polyvinyl alcohol than from other polymers because the former cannot be directly processed by a conventional thermoplastic procedure. The reason for this is that polyvinyl alcohol decomposes below its crystallite melting point. For thermoplastic processing, for example by extrusion, it is therefore necessary to lower the softening range of the polyvinyl alcohol. This is effected in general by mixing it, before extrusion, with suitable additives.

German Laid-Open Application DOS No. 2,114,767 discloses that an aqueous solution of polyvinyl alcohol and further additives can be extruded through a sheet die to give sheeting which may then be laminated to other plastic sheeting. In this process, however, an aqueous solution of the polyvinyl alcohol must first be prepared before extrusion and, in addition, the water must be removed, after extrusion of the sheeting, in a separate drying step requiring a large amount of energy.

Furthermore, plasticizer-containing, free-flowing polyvinyl alcohols for thermoplastic processing and extrusion are known. Such dry blends, as described in, for example, U.S. Pat. No. 4,215,169 and German Laid-Open Application DOS No. 2,812,684, in spite of the fact that they contain a relatively high proportion of plasticizer and may or may not contain a relatively high proportion of water, are still free-flowing, and can be extruded without further aids to give sheeting or panels. Any water present in these dry blends does not need to be removed after extrusion, so that an expensive, downstream drying step is not absolutely necessary. The preparation of these blends is carried out in special apparatus (forced-circulation mixers) using a technique which is very demanding in respect of the temperature regime and the temperature/time relationship (cf. German Laid-Open Application DOS No. 2,812,684), and presents problems in particular in the case of the low molecular weight polyvinyl alcohols having a low degree of hydrolysis. In order that they may be further processed in an extruder, these blends must be free-flowing. This property is imparted by the addition of antiblocking agents, for example highly disperse silicic acids, but this has an adverse effect on the optical properties of the resulting polyvinyl alcohol sheeting.

It is an object of the present invention to provide a process for the extrusion of polyvinyl alcohols which permits the production of optically clear, high-grade films, sheeting or panels in a simple and economical manner, using commercial polyvinyl alcohols.

We have found that this object is achieved by a method wherein, in a multi-screw extruder, polyvinyl alcohol is mixed with a small amount of water, this mixture is homogenized and melted, and the melt is devolatilized to remove undesirable volatile constituents, and then extruded and shaped in a conventional manner to give the desired sheet-like structure.

The present invention accordingly relates to a process for the production of a sheet-like structure from a vinyl alcohol polymer by processing, in an extruder, a mixture of this polymer with water, and then producing the sheet-like structure by shaping, wherein the said polymer is mixed, in a self-cleaning multi-screw extruder with an amount of water which is insufficient to dissolve the polymer under standard conditions of temperature and pressure, with or without conventional additives, the mixture is transported and homogenized and at the same time melted, any excess water present and other undesirable volatile constituents are removed by devolatilizing the melt, and the latter is discharged from the extruder and simultaneously shaped in a conventional manner into the sheet-like structure.

It has been found that, surprisingly, when extruding polyvinyl alcohol, it is not necessary to use an aqueous solution or a plasticizer-containing polyvinyl alcohol, it being sufficient if a commercial polyvinyl alcohol is mixed with a small amount of water, in the extruder. Just as unexpected was the fact that excess water can be removed from the extruder even during extrusion, without the quality of the extrudate being in any way adversely affected by this step, so that as a rule an expensive downstream drying step can be dispensed with. Using the novel process, it is possible to extrude polyvinyl alcohol even in the absence of plasticizers, thus making possible the production of a substantially wider range of polyvinyl alcohol sheeting or panels than obtainable hitherto.

For the purposes of the invention, sheet-like structures are films, sheeting, panels, strips and the like composed of vinyl alcohol polymers. These structures also include, for example, multi-layer elements and laminates in which one or more layers is composed of a vinyl alcohol polymer.

For the purposes of the invention, vinyl alcohol polymers are polymers whose main chains contain, preferably to a predominant extent, repeating $CH_2$—$CH(OH)$ units. These include polyvinyl alcohol itself, copolymers of vinyl alcohol with other comonomers, and derivatives, eg. ethers and/or esters, of polyvinyl alcohols, in particular the partially hydrolyzed polyvinyl esters of monocarboxylic acids of 2 to 4 carbon atoms, especially partially hydrolyzed polyvinyl acetates. The degree of hydrolysis of the polyvinyl esters is in general from 60 to 99, preferably from 80 to 97, mole %. The degree of polymerization of the partially hydrolyzed polyvinyl esters can be from 250 to 3,000, in particular from 300 to 2,000. The vinyl alcohol polymers also include the reaction products of polyvinyl alcohol or partially hydrolyzed polyvinyl acetate, for example with ethylene oxide, and these products may contain from 10 to 30% by weight, based on the reaction product, of chemically bonded ethylene oxide units. Further examples include the acryloyl-containing and/or methacryloyl-containing vinyl alcohol polymers, as obtained by the reaction of polyvinyl alcohol or partially hydrolyzed polyvinyl acetate with acrylic anhydride and/or methacrylic anhydride. Such polymers contain in general from 1 to 30% by weight, based on the reaction product, of acryloyl and/or methacryloyl groups.

To carry out the novel process, self-cleaning multi-screw extruders, in particular twin-screw extruders, as conventionally used for processing thermoplastics, are employed. The extruder possesses 2 or more feed inlets through which the starting materials enter, one or more devolatilizing orifices and an orifice through which the melt is discharged. The product-transporting zone of the extruder can be heated, for example by means of an external heating jacket, and it is advantageous if the temperature in the direction of product flow can be set independently in individual zones. The screw geometry and the type of screw elements depend primarily on the vinyl alcohol polymer employed and on any further additives which may be mixed with this polymer. Advantageously, the screw elements are matched in a conventional manner, in respect of their design and geometry, to the operating conditions prevailing in the individual zones of the extruder (entry of the substances, mixing, homogenization, transport, etc.).

To carry out the novel process, first the vinyl alcohol polymer and then the water are fed into the extruder in the direction of product flow. The amount of water used is such that it is not sufficient, under standard conditions of temperature and pressure, to dissolve the vinyl alcohol polymer. This amount is conventionally from about 5 to 40% by weight, based on the vinyl alcohol polymer. The amount of water depends in particular on the type of vinyl alcohol polymer employed and on any additives which may be present. For example, a somewhat smaller amount of water can be employed in the case of low molecular weight vinyl alcohol polymers than in the case of relatively high molecular weight vinyl alcohol polymers. In this case, also, a smaller amount of water is sufficient if, in addition to the vinyl alcohol polymer, further additives, for example low molecular weight organic compounds, such as hydroxyalkyl acrylates or hydroxyalkyl methacrylates, or small amounts of conventional plasticizers, are employed in the novel process. The addition of a somewhat larger amount of water, for example above 40% by weight, based on the vinyl alcohol polymer, although not necessary, is in general neither deleterious nor disadvantageous for the novel process since, in accordance with the invention, excess water and any troublesome further volatile constituents which may be present are removed from the melt before the vinyl alcohol polymer is discharged from the extruder. In general, the amount of water added should be not less than that required for satisfactory extrusion of the vinyl alcohol polymer, and it has been found that in every case the amount of water sufficient for this purpose is less than that required to dissolve the vinyl alcohol polymer employed, under standard conditions of temperature and pressure.

The vinyl alcohol polymer and the water are first mixed in an extruder, in general at from 20° to 100° C., preferably from 20° to 60° C., to achieve uniform distribution of the components. The polymer is probably swollen by the water at as early a stage as this. After this mixing operation, the polymer/water mixture is melted and the melt is homogenized. It has been found that this may be carried out advantageously at from 80° to 200° C. In particular, the melting zone and homogenization zone of the extruder are at from 120° to 190° C., the stated temperatures being the barrel temperatures of the extruder, ie. the temperatures of the heating medium. The melt may be homogenized in a conventional manner, using screws with mixing disks or other suitable mixing elements.

Any additives which are to be mixed into the vinyl alcohol polymer may be fed into the extruder in principle at any desired point between the entry of the polymer and the devolatilizing of the melt to remove undesirable volatile constituents. For example, the additives may be mixed with the homogeneous melt comprising the vinyl alcohol polymer and water. In this case, it is expedient to provide a further homogenization zone downstream from the point at which the additives are fed in, and to devolatilize the melt downstream from this feed point in order that undesirable volatile constituents introduced with the additives can also be removed. In the above, the order in which the individual zones are arranged is always viewed in the direction of product flow. However, it is also possible to feed the additives into the extruder between the feed point of the vinyl alcohol polymer and the melting and homogenization zone. For example, the additives may be added at the same point as the water, or even together with the water. The point at which the additives are fed into the extruder depends primarily on the type of additives. Water-soluble additives, for example, are advantageously added together with the water, in the form of an aqueous solution. Plasticizers and/or lubricants are preferably added between the feed point of the vinyl alcohol polymer and the melting and homogenization zone. Thermally unstable substances are in general only mixed into the melt.

Additives which may be mixed with the vinyl alcohol polymer are the compounds which are conventionally used for this purpose, for example inorganic or organic fillers, pigments, dyes, compatible saturated and/or ethylenically unsaturated low molecular weight organic compounds, thermal stabilizers, etc. Also included are, for example, plasticizers and lubricants. For the production of photopolymer printing plates, as described in, for example, German Laid-Open Application DOS No. 2,114,767 cited at the outset, the vinyl alcohol polymer may, in addition to compatible, photopolymerizable, ethylenically unsaturated, low molecular weight compounds, also contain polymerization initiators, in particular photoinitiators, with or without thermal polymerization inhibitors, the components being mixed homogeneously.

Such additives include, for example, clays, calcium hydroxide, calcium carbonate, silicates, aluminates, hydrated aluminosilicates, and organic compounds, such as long-chain fatty acids, metal salts of the fatty acids, alcohols, in particular polyhydric alcohols, amides, waxes, partially oxidized low molecular weight polyethylenes, polyethers, eg. polyethylene glycol, and silicones. Examples of photopolymerizable ethylenically unsaturated compounds are in particular hydroxylalkyl acrylates and methacrylates, eg. monoacrylates and monomethacrylates of ethylene glycol, propylene glycol and butane-1,4-diol, and diacrylates, dimethacrylates, polyacrylates or polymethacrylates of diols or polyols, for example the above diols, diethylene glycol, triethylene glycol, tetraethylene glycol, neopentyl glycol and trimethylol propane. Suitable photopolymerization initiators include benzoin and benzoin derivatives, eg. benzoin ethers, aromatic diketones, eg. benzil, and derivatives of benzil, eg. benzil dimethyl ketal and benzil methyl ethyl ketal, and the conventional acylphosphine oxide compounds. As regards further details concerning the starting materials and the production of photopolymer printing plates based on vinyl alcohol polymers, reference may be made to the relevant literature, for example German Laid-Open Application DOS No. 2,114,767.

The type and amount of additives depends on the type of vinyl alcohol polymer employed and in particular on the intended end use of the sheet-like structure produced by the novel process. In general, for example in the production of sheeting for the packaging sector, the amount of additives does not exceed 40, especially 30, % by weight, based on the sum of vinyl alcohol polymer and additives. For special end uses, for example the production of photopolymer printing plates, the amount of the above additives may however also be greater, for example as much as 60 or 65% by weight, based on the sum of vinyl alcohol polymer and additives. In such mixtures, the ratio of vinyl alcohol polymer to photopolymerizable low molecular weight compound is in general from 90:10 to 50:50% by weight, based on the sum of the polymer and the photopolymerizable compound.

The homogenous vinyl alcohol polymer melt, into which any additives employed have already been mixed, is freed, in a devolatilizing zone, from undesirable volatile constituents, before being discharged from the extruder. During the devolatilizing stage, it is also possible, in particular, to remove excess water from the melt and to adjust its water content, for example, to the content desired in the end product, provided that the extrudability of the melt is not adversely affected by this operation. After devolatilizing, the vinyl alcohol polymer melt is extruded, the material temperature during extrusion being in general from 80° to 130° C.

The sheet-like structure composed of the vinyl alcohol polymer is advantageously shaped directly during extrusion. For this purpose, it is possible to employ the methods conventionally used for shaping sheet-like structures from thermoplastics, for example extrusion through slot-shaped dies, in particular sheet dies, or tubular dies, as well as the film-blowing method. The latter method is particularly suitable for the production of oriented or stretched films or sheeting, as used in, for example, the packaging sector. To produce unoriented sheeting, films or panels, such as those used as covering or protective sheeting or as self-supporting panels or layers in laminates, the extrusion is carried out in general by means of a sheet die. When extrusion is carried out through such a die, the thickness can be subsequently adjusted very precisely and within a small range of variation advantageously by passing the extruded sheeting or panel through a two-roll or multi-roll calender. A process of this type may also be advantageously used for the production of laminates or sandwich panels by passing the vinyl alcohol polymer sheeting, together with further sheeting on one or both sides of the polymer sheeting (these further sheets consisting of, for example, another plastic, or metal), through the calender so that these further sheets are laminated onto the surface or surfaces of the vinyl alcohol polymer sheeting or panel and are bonded to it. This procedure is particularly advantageous in the production of multi-layer elements, as used for producing photopolymer printing plates, for example as described in German Laid-Open Application DOS No. 2,114,767.

Using the process according to the invention, it is possible to produce sheet-like structures directly from vinyl alcohol polymers in a simpler and more economical manner, without it being necessary to employ plasticizer-containing vinyl alcohol polymers in the process. The small amount of water which still remains in the vinyl alcohol polymer sheeting or panels after the novel process has been carried out does not in any way have an adverse effect on the mechanical or optical properties or other performance characteristics of these sheet-like structures, and does not need to be removed by a subsequent drying step. Because of the large variety of vinyl alcohol polymers which may be employed and of additives which may, if required, be mixed in, the novel process can be used in general, without restriction, for the production of any desired sheet-like structures composed of vinyl alcohol polymers, and gives products having satisfactory properties, in particular excellent optical properties.

The sheet-like structures composed of vinyl alcohol polymers can be employed, for example, in the packaging sector and for the production of protective or covering sheeting and multi-layer elements.

The Examples which follow illustrate the invention. Parts and percentages are by weight, unless stated otherwise.

EXAMPLE 1

First 30 parts of a partially hydrolyzed polyvinyl acetate (degree of polymerization about 300 and degree of hydrolysis about 82 mole %) and then 10 parts of water were fed, in the direction of product flow, into a self-cleaning twin-screw extruder which had screws arranged side-by-side and rotating in the same direction and was equipped with a heating jacket comprising a number of individually controllable zones. The components were mixed in a first zone where the heating jacket was at about 40° C., and the mixture was then melted and homogenized in a second zone where the heating jacket was at 180° C. Thereafter, 30 parts of hydroxyethyl methacrylate and 1 part of trimethylbenzoyldiphenylphosphine oxide (photoinitiator) were mixed into the melt, at a lower heating jacket temperature of 100°–120° C. The mixture was homogenized, after which the melt was devolatilized and then extruded through a sheet die at a material temperature of about 100°–110° C. The extrudate was fed directly to a calendar, where it was calibrated, between two polyester sheets, to give 2 mm thick sheeting. After the polyester sheeting had been separated off and the sheeting exposed to actinic light over its entire surface, the resulting speck-free polyvinyl alcohol panel was as clear as glass and had a water content of 13%, which changed to 4–10% over a period of time, depending on the atmospheric humidity. The panel obtained is very suitable as a sheet of non-fogging imitation glass.

EXAMPLE 2

200 parts of a partially hydrolyzed polyvinyl acetate (degree of hydrolysis 80–82 mole %, mean degree of polymerization 500) and 100 parts of an oxyethylated partially hydrolyzed polyvinyl acetate (content of ethylene oxide units 22%, mean molecular weight about 30,000) were introduced into a twin-screw extruder which had closely meshing screws rotating in the same direction (screw diameter: 53 mm, length: 40 D), and 15 parts of water were then metered in. The components were homogenized in a downstream zone of the extruder at a barrel temperature of 160° C., after which 200 parts of a 9:1 mixture of hydroxypropyl acrylate and tetraethylene glycol dimethacrylate, 20 parts of benzil dimethyl ketal and 2 parts of 2,6-di-tert.-butyl-p-cresol were introduced at a barrel temperature of 130° C. and mixed to give a homogeneous mixture. Thereafter, the melt wad devolatilized under atmospheric pressure, cooled to 110° C. and extruded through a sheet die to give sheeting about 1 mm thick. By applying this sheeting to a steel base provided with a layer of adhesive and simultaneously smoothing the surface thereof in a calendar, a multilayer plate was obtained. This was processed into a letterpress printing plate by exposing it imagewise to actinic light and washing out the unexposed areas of the layer with water.

EXAMPLE 3

190 parts of a partially hydrolyzed polyvinyl acetate (degree of hydrolysis about 80 mole %, mean degree of polymerization about 500) were first metered, in the direction of product flow, into a twin-screw extruder of the type described in Example 2, after which 15 parts of water were added at 25° C. and mixed in. Thereafter, a further 20 parts of water were added at 90° C. and were mixed in, and this was followed by the addition of 30 parts of glycerol. Mixing in the glycerol and homogenizing the melt were carried out at a barrel temperature of 160° C. The homogeneous melt was devolatilized at a barrel temperature of 130° C. under 0.8 bar, and then extruded at 100° C. through a blowing head and squeezed to give sheeting suitable, for example, for packaging purposes.

EXAMPLE 4

300 parts of a partially hydrolyzed polyvinyl acetate (degree of hydrolysis 82 mole %, mean degree of polymerization 450) and 15 parts of water were first mixed in a twin-screw extruder which had closely meshing screws rotating in the same direction (diameter: 53 mm, length: 50 D), and the mixture was melted at a barrel temperature of 140° C. Thereafter, a further 30 parts of water were metered in and mixed in, and finally 280 parts of hydroxyethyl methacrylate, 60 parts of hexanediol diacrylate, 10 parts of benzil dimethyl ketal and 1 part of 2,6-di-tert.-butyl-p-cresol were fed in. After homogenization at a barrel temperature of 120° C., the melt was devolatilized at this temperature under atmospheric pressure, and then extruded through a sheet die to give 0.5 mm thick sheeting. This sheeting was laminated onto a metal base to give a multi-layer element which could be processed by imagewise exposure and development in water to give a letterpress printing plate.

We claim:

1. A process for the production of a sheet-like structure from a vinyl alcohol polymer which comprises, in sequence, the following steps:
separately feeding into a self-cleaning multi-screw extruder, in the direction of product flow, first the vinyl alcohol polymer and then an amount of water which is insufficient to dissolve the polymer under standard conditions of temperature and pressure,
and, while transporting them through the extruder,
mixing the vinyl alcohol polymer and the water at temperatures in the range of from 20° to 100° C. to achieve uniform distribution of the polymer and the water,
melting the polymer/water mixture and homogenizing the melt at temperatures in the range of from 80° to 200° C.,
devolatilizing the homogeneous melt to remove any excess water and to adjust the water content of the melt to the water content desired in the end product without the extrudability of the melt being adversely affected hereby and to remove other undesirable volatile constituents, and
discharging the melt from the extruder while simultaneously shaping it into the sheet-like structure,
wherein the stated temperatures being the barrel temperatures of the extruder.

2. The process of claim 1, wherein the amount of water added is about 5 to 40% by weight, based on the vinyl alcohol polymer.

3. The process of claim 1, wherein the melt is discharged from the extruder at temperatures in the range of from 80° to 130° C.

4. The process of claim 1, wherein further compounds are fed into the extruder and are homgeneously mixed into the vinyl alcohol polymer, said compounds being fed into the extruder at any point after the feed point of the vinyl alcohol polymer and before devolatilizing the homogeneous melt.

5. The process of claim 4, wherein said further compounds are selected from the group consisting of fillers, plasticizers, lubricants, dyes, pigments, stabilizers and compatible low molecular weight organic compounds.

6. The process of claim 1, wherein the vinyl alcohol polymer and water are mixed at temperatures in the range of 20° to 60° C.

7. The process of claim 1, wherein the melting of the polymer/water mixture and the homogenization of the melt is carried out at temperatures in the range of from 120° to 190° C.

8. A process for the production of a sheet-like structure of a vinyl alcohol polymer having homogeneously incorporated at least one compatible, ethylenically unsaturated, low molecular weight organic compound and at least one polymerization initiator, which process comprises the following steps:
separately feeding into a self-cleaning multi-screw extruder in the direction of product flow, first the vinyl alcohol polymer and then an amount of water which is insufficient to dissolve the polymer under standard conditions of temperature and pressure,
and while transporting them through the extruder,
mixing the vinyl alcohol polymmer and the water at temperatures in the range of from 20° to 100° C. to achieve uniform distribution of the polymer and the water and
melting the polymer/water mixture and homogenizing the melt at temperatures in the range of from 80° to 200° C.,
further feeding into the extruder, at any point after the feed point of the vinyl alcohol polymer but before the subsequent devolatilizing step, at least one ethylenically unsaturated, low molecular weight organic compound, which is compatible with the vinyl alcohol polymer, and at least one polyerization initiator and homogeneously mixing said further compounds with the vinyl alcohol polymer to finally achieve a homogeneous melt of the vinyl alcohol polymer containing the water and said further compounds,
devolatilizing said homogeneous melt to remove excess water adjusting its water content to the water content desired in the end product without hereby adversely affecting the extrudability of the melt and to remove other undesirable volatile constituents, and
discharging the melt from the extruder while simultaneously shaping it into the sheet-like structure,
wherein the stated temperatures being the barrel temperatures of the extruder and are so adjusted that said ethylenically unsaturated organic compounds and said polymerization initiator do not react during extrusion.

9. The process of claim 8, wherein the amount of water added is about 5 to 40% by weight, based on the vinyl alcohol polymer.

10. The process of claim 8, wherein the melt is discharged from the extruder at temperatures in the range of from 80° to 130° C.

11. The process of claim 8, wherein further to the ethylenically unsaturated, low molecular weight organic compound and the polymerizationn initiator, one or more additives, selected from the group consisting of fillers, plasticizers, lubricants, dyes, pigments, stabilizers, thermal polymerization inhibitors and compatible, saturated, low molecular weight organic compounds, are fed into the extruder and are homogeneously mixed in the vinyl alcohol polymer, said additives being fed into the extruder at any point after the feed point of the vinyl alcohol polymer and before devolatilizing the homogeneous melt.

12. The process of claim 8, wherein said ethylenically unsaturated low molecular weight compound is a photopolymerizable compound and said polymerization initiator is a photoinitiator.

13. The process of claim 12, wherein the ratio of the vinyl alcohol polymer to the photopolymerizable low molecular weight compound is from 90:10 to 50:50 by weight.

14. The process of claim 8, wherein the mixing of the vinyl alcohol polymer with the water is carried out at temperatures in the range of from 20° to 60° C.

15. The process of claim 8, wherein the melting of the polymer/water mixture and the homogenization of the melt is carried out at temperatures in the range of from 120° to 190° C.

16. The process of claim 1, wherein the melt is extruded in form of a sheeting or panel, the thickness of which is subsequently adjusted by passing the extruded sheeting or panel through a two-roll or multi-roll calendar.

17. The process of 8, wherein the melt is extruded in form of a sheeting or panel, the thickness of which is subsequently adjusted by passing the extruded sheeting or panel through a two-roll or multi-roll calendar.

* * * * *